May 10, 1938.   J. O. BULLARD ET AL   2,116,614
APPLIANCE FOR TREATING MEAT
Filed April 18, 1936
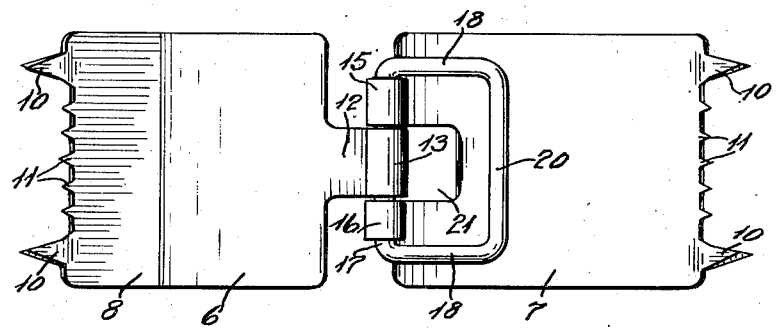
Fig. 1.
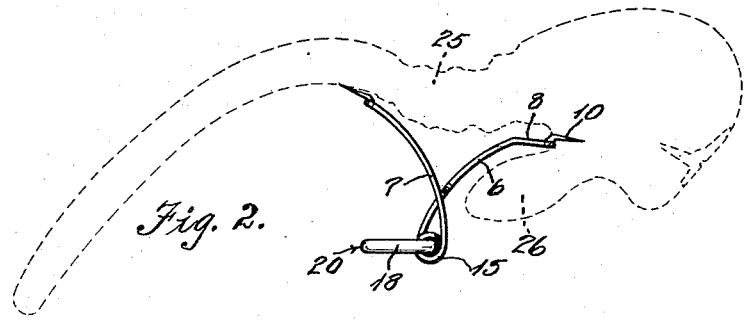
Fig. 2.
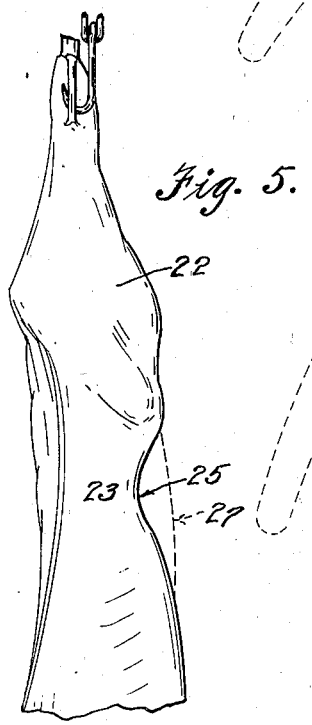
Fig. 5.
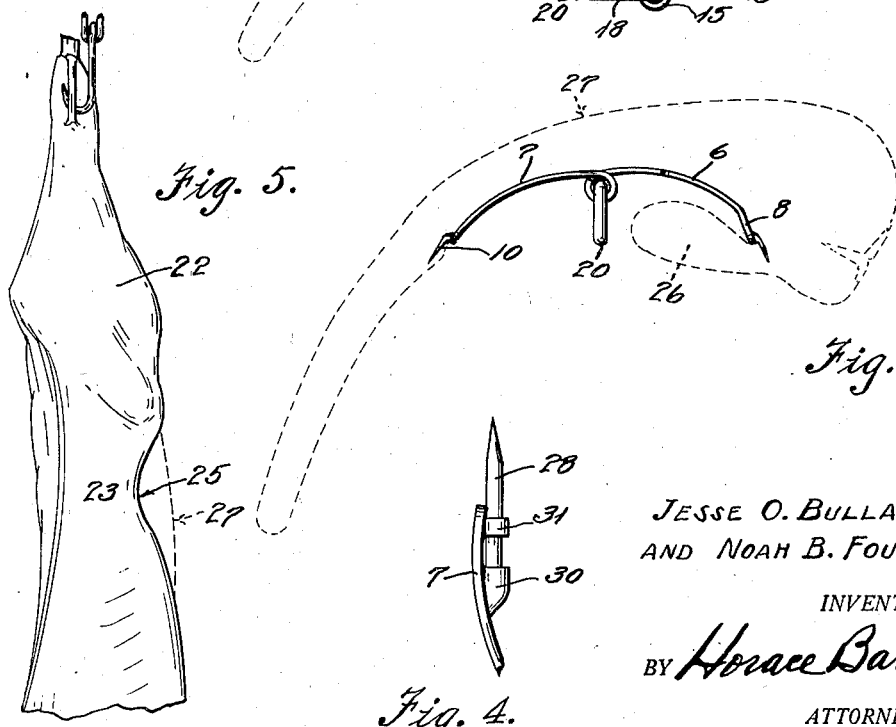
Fig. 3.
Fig. 4.
JESSE O. BULLARD,
AND NOAH B. FOUCH,
INVENTORS.
BY Horace Barnes,
ATTORNEY Patented May 10, 1938

2,116,614

UNITED STATES PATENT OFFICE 2,116,614

APPLIANCE FOR TREATING MEAT

Jesse O. Bullard, Huntington Park, and Noah B. Fouch, Los Angeles, Calif., assignors, by direct and mesne assignments, to Atlas Meat Appliance Co., Los Angeles, Calif., a corporation of California Application April 18, 1936, Serial No. 75,144

11 Claims. (Cl. 17—44)

This invention relates to improvements in appliances utilized in the butchering and care of meat for the market.

When a beef or other meat-animal is freshly slaughtered, dressed and split ready to be chilled, the two sides thereof are hung by the hind leg in such manner that the loin region between the hind leg and the short ribs are drawn inwardly and assume a shrunken, hollow form and appearance which is unsuitable for the cutting of steaks therefrom, lowers the grade and price obtained from the meat sold therefrom, and prevents the proper wrapping or shrouding of the side of beef.

It is the principal object of our invention to provide an appliance of simple and practicable construction that may be readily and quickly applied to the inner side of a side of beef to distend the flesh outwardly to present a full, rounded contour at the loin so that when cooled and rigor mortis sets in the said appliance may be removed so that the meat retains its rotund form and steaks of normal, marketable appearance may be cut therefrom.

Other objects and advantages residing in our invention, and objects relating to details of construction and arrangements of parts thereof will be readily apparent in the course of the detailed description to follow.

The accompanying drawing illustrates by way of example a representative form of our invention, in which:

Figure 1 is a view in rear elevation of a meat distending appliance embodying our invention.

Fig. 2 is a plan, edgewise view of the same in partially folded condition, as the same may appear when being inserted in a side of beef, the latter being shown in broken lines in section.

Fig. 3 is a view similar to Fig. 2 with the appliance shown in expanded position within a side of beef.

Fig. 4 is a fragmentary edgewise view in elevation of a modified form of a detail of the invention.

Fig. 5 is a partial view in elevation of a side of beef illustrating the purposes of the invention.

Referring to said views, wherein similar reference characters designate like parts in the several views, the reference numerals 6 and 7 indicate, respectively, a pair of sheet metal spreader-plates of generally rectangular configuration hingedly connected together. Said plates are each curved outwardly in the major axis of the appliance upon relatively large and substantially identical radii, the plate 6 terminating at its outer end in a plane, tangent portion 8. Said plates are further formed at their outer extremities in integral, pointed tines 10 adjacent their respective lateral edges and intermediate thereof smaller teeth 11 may be provided.

The hinged connection provided between said plates comprises a tang 12 extending integrally in the horizontal axis of the plate 6 formed in a cylindrical barrel 13 at its extremity. The plate 7 is similarly formed with integral barrels 15 and 16 located to register upon opposite sides of the barrel 13 to receive a pintle-pin 17 in the registering bores provided therein. Said pin is extended rearwardly in arms 18 to provide an integral handle 20 medially convenient for a grasping hold by the hand of the operator in the manipulation of the appliance.

The provision of the extended tang 12 and of a recess 21 formed in the plate 7 between the barrels 15 and 16 admits of the sufficient folding of the plates upon each other to facilitate insertion of the appliance in operative position within the carcass in spite of their outward curvature, as seen in Fig. 2.

The operation of our improved appliance may be briefly described as follows with relation to a side of beef, while it is to be understood that the appliance may be utilized upon other meat animals, such as calves, sheep or hogs in similar manner and with like effect: The side of beef 22, see Fig. 5, when freshly dressed and ready to be conveyed into the chilling room is still soft and relatively flabby so that the loin portion 23 will be drawn in, giving somewhat the effect indicated at 25 in broken lines in Fig. 2 and in full lines in Fig. 5.

The operator grasping the appliance in folded condition by the handle 20 will push the tines 10 of the plate 6 into the meat at the inner side of the carcass immediately behind the kidney 26, see Fig. 2. The angular substantially straight portion 8 of the plate 6 directs the tines somewhat outwardly into the fatty portion of the meat behind the kidney instead of into the better portion of the meat, thus avoiding any degrading of the meat that may be cut into steaks.

The operator will then jab the tines of the opposite plate 7 into the meat at a horizontally spaced distance from where the plate 6 is engaged, opening up the plates of the appliance to some extent, and then push outwardly upon the handle to cause the hinge-point to pass a central line assumed to extend between the outer extremities of the plates, whereupon the tension afforded by the engagement of the plates in the meat will aid with little additional pressure upon the handle to cause the plates to closely engage the meat and press the same outwardly in rotund condition, as seen in Fig. 3, thus filling in outwardly the depression noted at 25 in Figs. 2 and 5 to somewhat as indicated in broken lines 27 in said views.

With the appliance engaged in the manner described it will retain itself indefinitely in place so that the side of beef may be conveyed into the refrigerator and chilled. Rigor mortis setting in the carcass within the next few hours ensures that the side will retain its rounded external appearance, so that the appliance may be removed and be again utilized in repeated like operations.

It will thus be apparent that after our appliance has been used in somewhat the manner described that the loin portion of the beef, which includes some of the choicest meat of the animal, may then be utilized for steaks bringing the highest price, whereas formerly such portions of the animal were reduced to roasts or inferior cuts at a sharp price reduction. Also such treatment of the side of beef facilitates the wrapping or shrouding of the same for shipment, by filling in the relatively deep hollows formed in the loin section thereof.

In Fig. 4 we have shown a modified form of tine at the extremities of the plates 6 and 7, consisting in a pointed detachable spike 28 rigidly set in a socket 30 and strap 31, welded to or integral with the plate.

Having described our invention, what we claim, is:

1. A device for shaping a meat carcass, including two curved carcass-engaging members, and means pivotally connecting the members so that they may be swung into shaping contact with the carcass by moving the axis of said means past a center line extending between corresponding opposing points on the members.

2. A device for shaping a meat carcass, including two carcass-shaping members, and means pivotally connecting the members, the members being curved about axes substantially parallel with the axis of said means whereby pivotal movement of the members to move said axis past a center line extending between corresponding opposing points on the members spreads or contracts the members relative to the carcass, depending upon the direction of such movement.

3. A device for shaping a meat carcass, including two carcass-shaping members whose outer extremities are adapted to have spreading engagement with the carcass, and means hingedly connecting the inner edge portions of the members whereby relative pivotal movement of the members which moves the axis of said means beyond a line extending between corresponding points on the member forces the outer extremities into operative contact with the carcass.

4. An appliance of the class described, including a pair of plate-members curved to present convex front sides, means hingedly connecting the members including a pintle-pin, meat penetrating parts at the outer ends of said plate-members, and a handle integral with said pintle-pin and manually accessible at the rear sides of the said plate-members.

5. An appliance of the class described, including a pair of plate-members curved to have convex front sides and concave rear sides, a hinge-joint between said members having an axis substantially parallel with the axes of their curvatures and including a pivot-pin, meat entering tines at the outer extremities of said members, and a handle integral with the said pivot-pin and projecting from and engageable at the concave sides of the hinged-together members.

6. An appliance of the class described, including a pair of plate-members, a hinge-joint hingedly connecting the said members, said members being curved about axes substantially parallel with the axis of said hinge-joint to have convex front sides and concave rear sides, meat-engageable tines at the outer extremities of said members, the outer end of one of said members extending in a plane at an angle with a tangent to the curvature of the member, and a handle connected to the said hinge-joint and engageable at the concave rear sides of the members.

7. An appliance for shaping a hanging meat carcass, comprising a plurality of plate-members hingedly connected together, and meat-penetrating parts at the outer extremities of said members, said members being curved to assume collectively an unbroken arcuate form when engaged in operative condition within the carcass with their convex sides in contact with the meat to shape the same.

8. An appliance for shaping a hanging meat-carcass, comprising a plurality of plate members, a hinge-joint connecting said members and including a pintle-pin cooperating with the members, the pintle-pin of said joint being formed to provide a handle, and meat-penetrating parts at the outer extremities of the members, the side of the appliance opposite said handle being convex when in operative position and engaged with in the carcass to shape the same.

9. An appliance for shaping a hanging meat-carcass, comprising a pair of plate-members, meat-penetrating parts at the outer extremities of the members, and a hinge-joint connecting the inner extremities of said members, said hinge-joint protruding upon one side of the assembly of the members, the opposite side of said assembly being convexely curved to contact with the meat of a carcass to shape the same.

10. An appliance for shaping a hanging meat-carcass, comprising a pair of plate-members of outwardly curved form pivotally connected together, and meat-penetrating parts at the outer extremities of the members, the pivotal axis of said members being movable after engagement of said parts with the carcass from one side of a line drawn between the opposite penetrating parts of said members to an extended condition at the opposite side of said line so that said members extend and shape the carcass.

11. A device for preventing the distortion of a meat carcass, including a pair of curved plate-members hingedly connected together to present convex surfaces for engaging the carcass, meat-penetrating parts provided at the outer ends of said plate-members, and a handle connected with said members intermediate said meat-penetrating parts to project from the concave sides of the said members for ready grasping.

JESSE O. BULLARD.
NOAH B. FOUCH.